US012726340B2

(12) United States Patent
Abi-Farah

(10) Patent No.: US 12,726,340 B2
(45) Date of Patent: Sep. 1, 2026

(54) SELECTABLE ENCRYPTION FOR 5G OPEN RADIO ACCESS NETWORK

(71) Applicant: Boost SubscriberCo L.L.C., Englewood, CO (US)

(72) Inventor: Bassem Abi-Farah, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 167 days.

(21) Appl. No.: 18/426,788

(22) Filed: Jan. 30, 2024

(65) Prior Publication Data

US 2025/0247216 A1 Jul. 31, 2025

(51) Int. Cl.
*H04L 9/08* (2006.01)
*H04L 9/40* (2022.01)

(52) U.S. Cl.
CPC ........ *H04L 9/0852* (2013.01); *H04L 63/1416* (2013.01); *H04L 63/1425* (2013.01)

(58) Field of Classification Search
CPC ............... H04L 9/0852; H04L 63/1416; H04L 63/1425
See application file for complete search history.

(56) References Cited

U.S. PATENT DOCUMENTS 12,073,300 B2 * 8/2024 Arbajian ............... H04L 9/0852
2005/0198490 A1 * 9/2005 Jaganathan ........... H04L 63/205 713/151
2011/0016513 A1 * 1/2011 Bailey, Jr. ........... H04L 63/1425 709/224
2011/0182428 A1 * 7/2011 Zhao ..................... H04L 9/0852 380/256
2017/0171170 A1 * 6/2017 Sun ..................... H04L 63/1408
2018/0254895 A1 * 9/2018 Castinado ............. H04L 9/0852
2021/0045193 A1 * 2/2021 Mishra .................. H04W 88/12
2021/0306145 A1 9/2021 Krauthamer et al.

(Continued)

OTHER PUBLICATIONS

Adnan et al., "Quantum Key Distribution for 5G Networks: A Review, State of Art and Future Directions, " Future Internet, Feb. 2022, 14(3):73, 28 pages.

(Continued)

*Primary Examiner* — Nam T Tran
(74) *Attorney, Agent, or Firm* — Lowenstein Sandler LLP

(57) ABSTRACT

Techniques for encrypting data within a 5G Open Radio Access Network (O-RAN) includes receiving, at a first module of the 5G O-RAN, a first set of one or more data packets encrypted using mathematical encryption. The method also includes determining, using a machine-learning model trained to detect cybersecurity threats, the existence of a cybersecurity threat associated with the voice or data transaction, and in response, determining to switch encryption from the mathematical encryption to quantum encryption. The method further includes encrypting the one or more data packets using a quantum encryption key to generate quantum-encrypted data packets, transmitting the quantum encryption key from the first module of the 5G O-RAN core to a second module of the 5G O-RAN over a quantum key distribution (QKD) channel, and transmitting the quantum-encrypted data packets from the first module of the 5G O-RAN to the second module of the 5G O-RAN.

20 Claims, 5 Drawing Sheets

(56) References Cited

U.S. PATENT DOCUMENTS

| | | | | |
|---|---|---|---|---|
| 2023/0099688 | A1* | 3/2023 | Ries | H04L 9/0852 713/150 |
| 2024/0113869 | A1* | 4/2024 | Trost | H04L 9/0852 |
| 2024/0305660 | A1* | 9/2024 | Albero | H04L 63/1416 |
| 2025/0150466 | A1* | 5/2025 | Miles | H04L 63/1416 |

OTHER PUBLICATIONS

Alves et al., "Machine Learning Applied to Anomaly Detection on 5G O-RAN Architecture," Procedia Computer Science, Jan. 2023, 222:81-93.
International Search Report and Written Opinion in International Appln. No. PCT/US2025/012377, mailed on Oct. 23, 2025, 16 pages.
Mehic et al., "Quantum Cryptography in 5G Networks: A Comprehensive Overview," IEEE Communications Surveys & Tutorials, Aug. 2023, 26(1):302-346.

* cited by examiner 500
502
504
506
508
510
512
514
516
520
522
524
530
532
534
536
550
552
554
556
558
560
562
564
566
568
570
572
574
580
582

SELECTABLE ENCRYPTION FOR 5G OPEN RADIO ACCESS NETWORK

TECHNICAL FIELD

This specification relates to security encryption in wireless networks such as 5G Open Radio Access Network (O-RAN).

BACKGROUND

Cellular systems such as 5G O-RANs control various global communications, and have become germane to various other systems, including for example, infrastructures for healthcare, self-driving vehicles, etc. Portions of 5G O-RANs are deployed in cloud computing architectures and communications among various functional modules of such systems are encrypted to make the systems secure.

SUMMARY

In one aspect, this document features a method of encrypting data within a 5G Open Radio Access Network (O-RAN). The method includes receiving, at a first module of the 5G O-RAN, a first set of one or more data packets pertaining to a voice or data transaction associated with the 5G O-RAN. The first set of one or more data packets are encrypted using mathematical encryption. The method also includes determining, using a machine-learning model trained to detect cybersecurity threats, the existence of a cybersecurity threat associated with the voice or data transaction, and in response, determining to switch encryption of the one or more data packets from the mathematical encryption to quantum encryption. The method further includes encrypting the one or more data packets using a quantum encryption key to generate quantum-encrypted data packets, transmitting the quantum encryption key from the first module of the 5G O-RAN core to a second module of the 5G O-RAN over a quantum key distribution (QKD) channel, and transmitting the quantum-encrypted data packets from the first module of the 5G O-RAN to the second module of the 5G O-RAN.

In another aspect, this document features a system of encrypting data within a 5G Open Radio Access Network (O-RAN). The system includes memory encoded with machine-readable instructions, and one or more processors coupled to the memory, the one or more processors configured to execute the machine-readable instructions, which when executed, cause the one or more processors to execute various operations. The operations include receiving, at a first module of the 5G O-RAN, a first set of one or more data packets pertaining to a voice or data transaction associated with the 5G O-RAN. The first set of one or more data packets are encrypted using mathematical encryption. The operations also include determining, using a machine-learning model trained to detect cybersecurity threats, the existence of a cybersecurity threat associated with the voice or data transaction, and in response, determining to switch encryption of the one or more data packets from the mathematical encryption to quantum encryption. The operations further include encrypting the one or more data packets using a quantum encryption key to generate quantum-encrypted data packets, transmitting the quantum encryption key from the first module of the 5G O-RAN core to a second module of the 5G O-RAN over a quantum key distribution (QKD) channel, and transmitting the quantum-encrypted data packets from the first module of the 5G O-RAN to the second module of the 5G O-RAN.

In another aspect, this document features at least one non-transitory machine-readable storage device encoded with machine-readable instructions, which when executed, cause one or more processing devices to execute various operations. The operations include receiving, at a first module of the 5G O-RAN, a first set of one or more data packets pertaining to a voice or data transaction associated with the 5G O-RAN. The first set of one or more data packets are encrypted using mathematical encryption. The operations also include determining, using a machine-learning model trained to detect cybersecurity threats, the existence of a cybersecurity threat associated with the voice or data transaction, and in response, determining to switch encryption of the one or more data packets from the mathematical encryption to quantum encryption. The operations further include encrypting the one or more data packets using a quantum encryption key to generate quantum-encrypted data packets, transmitting the quantum encryption key from the first module of the 5G O-RAN core to a second module of the 5G O-RAN over a quantum key distribution (QKD) channel, and transmitting the quantum-encrypted data packets from the first module of the 5G O-RAN to the second module of the 5G O-RAN.

Implementations of the above aspects can include one or more of the following features.

A determination can be made that the cybersecurity threat has been addressed, and in response, a determination to switch from the quantum encryption to the mathematical encryption can be made. The first module can be a cloud-deployed module of the 5G O-RAN core. The first module can be one of: an authentication server function (AUSF) module, a secure anchor function (SEAF) module, an access and mobility management function (AMF) module or a non-3GPP interworking function (N3IWF) module of the 5G O-RAN core. The second module can be one of: a secure anchor function (SEAF) module, an access and mobility management function (AMF) module, a non-3GPP interworking function (N3IWF) module of the 5G O-RAN core, or a g-NodeB (gNB) of the 5G O-RAN. The machine-learning model can be a deep learning model configured to detect cyber security threats. The QKD channel can be a fiber-optic channel. The quantum-encrypted data packets can be transmitted from the first module of the 5G O-RAN to the second module of the 5G O-RAN over the QKD channel.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

Various implementations of the technology described herein may provide one or more of the following advantages.

Upgrading to quantum encryption on an as-needed basis offers robust security during cyberattacks, preventing the need to shut down the entire O-RAN system for lengthy investigations. Once the attack is contained and the security risk subsides, switching back to traditional mathematical encryption saves on the potentially high costs of prolonged quantum encryption use. This intelligent encryption swapping ensures optimal 5G O-RAN operation without sacrificing network security, even during security breaches.

The details of one or more implementations of the present disclosure are set forth in the accompanying drawings and the description below. Other features and advantages of the description will become apparent from the following description, and from the claims. Unless otherwise defined, the technical and scientific terms used herein have the same meaning as commonly understood by one of ordinary skill in the art to which this invention belongs.

DETAILED DESCRIPTION

5G Open Radio Access Networks (O-RANs) are used in a wide variety of applications-including in high-security applications. Heightened cybersecurity measures are paramount in various 5G O-RAN applications-which has led to quantum encryption being considered for securing messages exchanged among various 5G O-RAN modules such as modules in cloud-native cores of such O-RANs. While quantum encryption provides highly secure communications, using such encryptions at all times can be expensive and therefore not feasible. On the other hand, using existing mathematical encryption may not provide adequate security in certain situations, for example, when a potential breach is detected. The technology described herein provides an intelligent mechanism to switch between mathematical encryption and quantum encryption based on assessing a level of threat. Specifically, a trained machine-learning model (e.g., a deep learning model) can be used to assess a level of threat/security breach and the encryption modality can be switched accordingly. For example, if a potential breach is detected, the encryption of information exchanged among modules of a cloud-native 5G Core of an O-RAN can be switched from mathematical encryption to quantum encryption to heighten the level of security while the root cause of the breach is investigated. The switch to quantum encryption can provide the security needed to continue operation with a high degree of confidence and obviate the need for a disruptive shut down of the O-RAN while the breach is investigated. When the breach is addressed and the threat level is reduced, the encryption modality can be switched back to mathematical encryption to avoid the potentially high costs associated with continued usage of quantum encryption. The intelligent switching of encryption modalities described herein therefore allows for optimal operations of a 5G O-RAN without compromising security of the network even at the time of potential security breaches.

Figure 1:
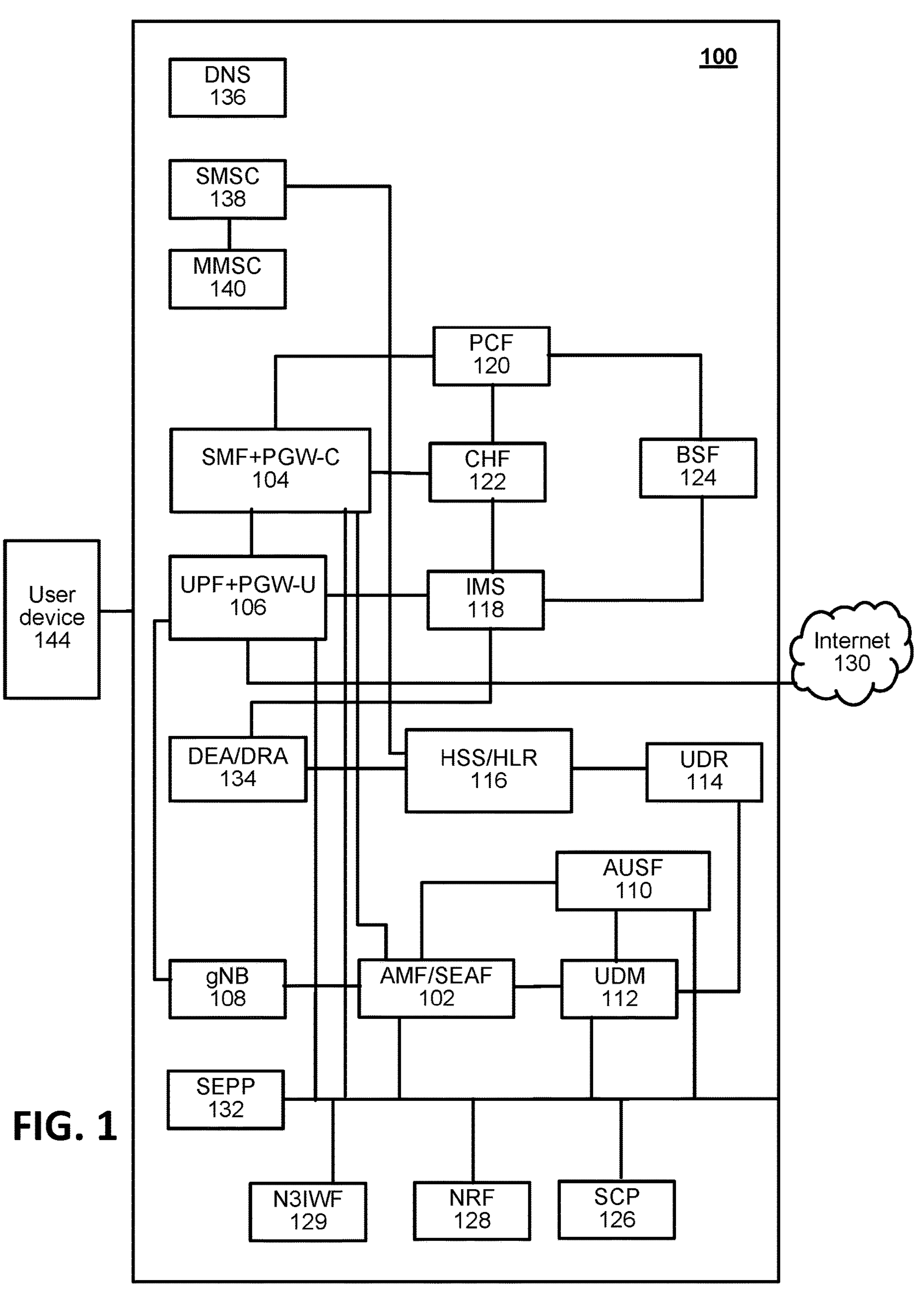
FIG. 1 is a diagram of an example of 5G O-RAN network environment in which the technology described herein can be implemented.

FIG. 1 depicts a diagram of an example of a network environment 100 and a user-device 144 connected to the exemplary network environment. As used herein, a network environment (sometimes referred to herein simply as an environment) refers to a set of multiple devices, modules, and functions that are configured to jointly enable wireless communication. For example, a network environment can include a 5G network that includes a set of multiple network devices, (e.g., devices implementing core network functions and application functions of the 5G O-RAN) and user equipment that are configured to jointly enable wireless communication. An environment, such as the environment 100, can be a portion of a 5G New Radio ("5G-NR" or simply "5G") cellular network environment. Standards for cellular network architectures have been described, for example, in 3GPP TS 23.501 (for 5G networks) and 3GPP TS 23.401 (for 4G long-term evolution "LTE" networks) (the entireties of which are hereby incorporated by reference). While FIG. 1 shows an example architecture for a network environment (i.e., environment 100), other variations are possible. For example, while the lines depicted in FIG. 1 depict connections among various modules of the network, the modules may be interconnected in other ways. Further, fewer or more modules may be present in other example network environments. While the technology described herein is described primarily with references to 5G O-RANs, the technology may be implemented in other types of wired or wireless networks.

Network environment 100 includes a packet core network, which includes an access management function (AMF) 102, a session management function and packet data network gateway-control module (SMF+PGW-C) 104, a user plane function and packet data network gateway-user plane module (UPF+PGW-U) 106, and a policy control function (PCF) 120. The AMF 102 receives all connection and session related information from one or more user-devices 144, and handles connection and mobility management tasks. The AMF 102 forwards all messages related to session management to the SMF+PGW-C module 104. The SMF+PGW-C module 104 and UPF+PGW-U module 106 jointly manage sessions and are configured using Control and User Plane Separation (CUPS). The PCF 120 communicates with the SMF+PGW-C module 104, governing control plane functions via defined policy rules. The UPF+PGW-U module 106 can provide access to the Internet 130 for data applications and the IP Multimedia Subsystem (IMS) core module 118 for voice applications. The IMS core module 118 is a separate application core network from the packet core network and supports voice services, messaging, voice calls, etc.

The environment 100 can further include a charging function (CHF) 122 and a binding support function (BSF) 124. The CHF 122 supports online and offline charging features and completes billing functions. The BSF 124 tracks sessions that are located anywhere in the environment 100, but share common criteria, such as subscriber identifiers. The BSF 124 communicates with the PCF 120 and binds application-function requests to specific PCF implementations, enabling policy scaling of the environment 100.

The environment 100 also includes a gNB 108 (i.e., a 5G base station), which handles run-side aspects of the network environment 100 and communicates, either directly or indirectly, with the packet core network elements such as AMF 102, SMF+PGW-C module 104, and UPF+PGW-U module 106. The gNB can include distributed units (DU) and central units (CU). This separation can provide security to user data because Dus—which may be deployed in unsupervised sites—typically do not have access to user communications. The CU (as well as the Non-3GPP Inter Working Function (N3IWF) 129) are deployed in sites with more restricted access.

The environment 100 further includes network elements to manage user or subscriber information. For example, the environment 100 includes an authentication service function (AUSF) 110 for user authentication and a unified data management (UDM) module 112. The user database is stored in a unified data repository (UDR) 114. The UDM 112 communicates with the AMF 102, AUSF 110, and the UDR 114 to provide centralized control of network user data. For interworking with 2G, 3G, and 4G network elements, the environment 100 also includes a Home Subscriber System and Home Location Register (HSS/HLR) module 116, which stores subscriber information, location and SIM details, and authentication keys. In some implementations, the AMF is collocated with the Security Anchor Function (SEAF) that holds the root key (known as anchor key $K_{seaf}$) for the visited network. The security architecture allows separation of the security anchor from the mobility function. The relation between the anchor key $K_{seaf}$ and other keys within a 5G core is described in detail with reference to FIG. 2.

The environment 100 further includes a service communication proxy (SCP) 126 and a network repository function (NRF) 128. In accordance with current 5G standards, network functions are based on HTTP version 2, and use the SCP 126 and NRF 128 to communicate. The NRF 128 is used to discover network functions in the environment 100, and the SCP 126 is used to provide a single point of entry for a cluster of discovered network functions, serving as a central control point in the signaling network core.

N3IWF (Non-3GPP Interworking Function) is a component of the 5G network architecture that enables interworking between 3GPP (Third Generation Partnership Project) and non-3GPP networks. This allows for a user device to connect with other networks beyond 5G (e.g., Wi-Fi, Ethernet etc.), and facilitates switches among various networks. On one hand, N3IWF connects with the 5G O-RAN core, and interacts with one or more of: the AMF 102, which handles device connections and mobility, the SMF 104, which oversees data sessions, and the UPF 106, which routes data traffic. On the other hand, the N3IWF also interfaces with non-3GPP access technologies like Wi-Fi APs and Ethernet switches.

The environment 100 further includes a security edge protection proxy (SEPP) 132, a diameter edge agent and diameter routing agent (DEA/DRA) module 134, and a domain name system (DNS) 136. The SEPP 132 is a security proxy through which all signaling traffic across operator networks is expected to transit. The DEA/DRA module 134 manages traffic and congestion of messages routed across the environment 100, routing signaling traffic and performing load balancing, relay, proxy and redirect functions within a carrier or interworking with other carriers. The DNS 136 is a naming database in which internet domain names are located and translated into internet protocol (IP) addresses. The environment 100 further includes a short message service center (SMSC) 138 and a multimedia message service center (MMSC) 140 configured to receive, store, route, and forward SMS messages and MMS messages, respectively.

The user-device 144 can interact with the network environment 100 indirectly through an external system/network or directly with the network environment 100 (e.g., via the gNB 108). In some cases, the user-device 144 can be a subscriber to the network environment 100 (e.g., a subscriber to a service provider of the cellular network). In other cases, the user-device 144 can be a non-subscriber roaming on the network environment 100.

Figure 2:
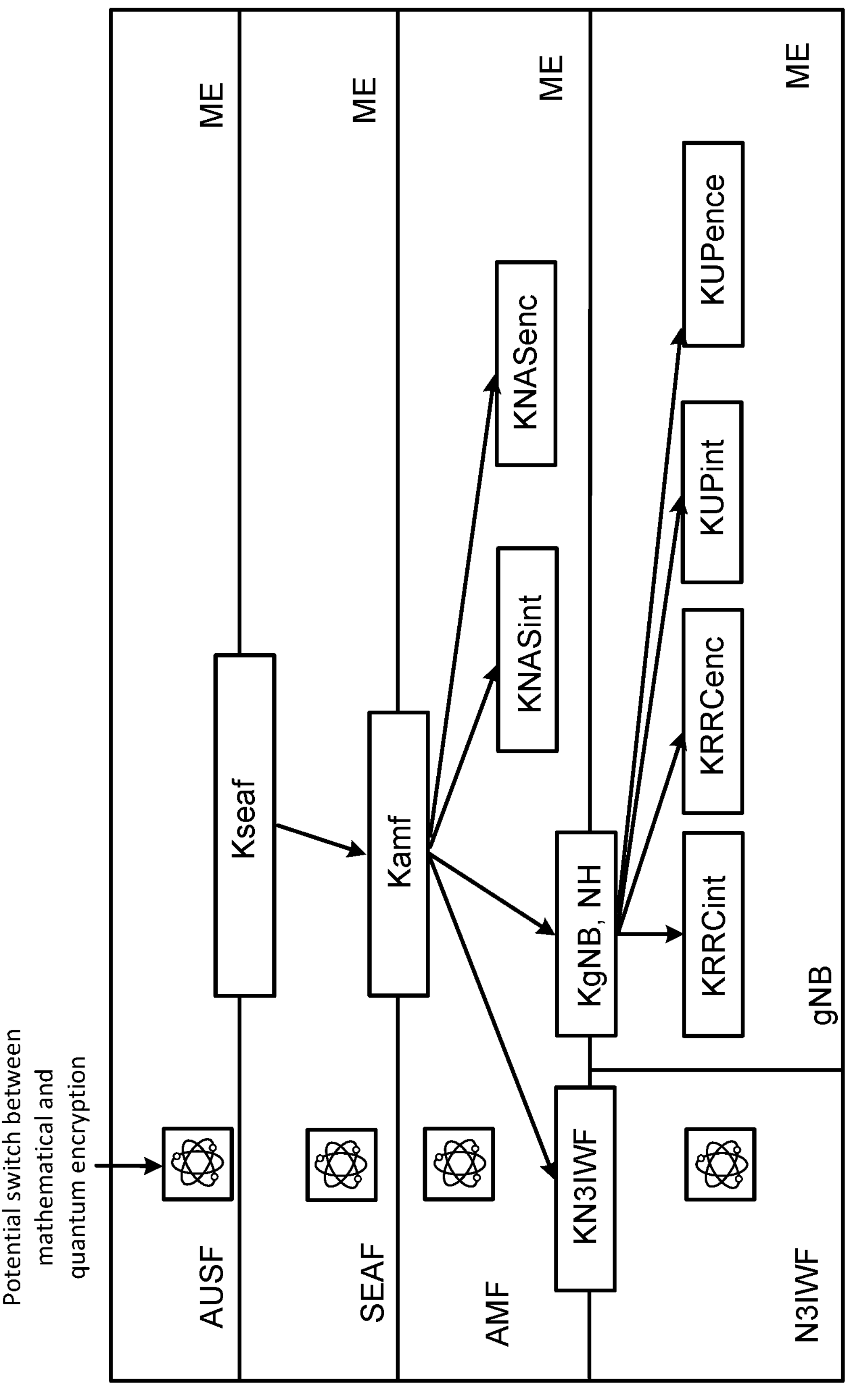
FIG. 2 is a diagram showing examples of various encryption keys associated with communications among various modules of the example environment of FIG. 1.

FIG. 2 is a diagram showing examples of various encryption keys associated with communications among various modules of the example environment of FIG. 1. In some implementations, the SEAF **102*b* is introduced in the 5G O-RAN core to serve as the anchor point for security. In some implementations, the SEAF 102*b* is co-located with the AMF 102*a* (and referred to together—as in FIG. 1—as AMF/SEAF 102). Functions and services of the SEAF/AMF 102 include acting as a pass-through authenticator where SEAF 102*b* provides the authentication functionality in the serving network via the AMF 102*a***. In some implementations, the SEAF supports primary authentication using a new 5G identifier called Subscription Concealed Identifier (SUCI).

In some implementations, multiple other authentication keys are derived from the anchor key $K_{SEAF}$. This key is provided by the AUSF 110 of the home network to the SEAF **102*b* of the serving network. The $K_{SEAF}$ key is derived from the AUSF key—an intermediate key derived by the user device 144 and the AUSF 110, for example. The $K_{SEAF}$ key allows the user device 144 to re-authenticate without the need for a new authentication process as the user device 144 moves between different access networks during mobility. In some implementations, the SEAF 102*b* generates the $K_{AMF}$ key from the $K_{SEAF}$ key following a key agreement and key authentication procedure between the SEAF 102*b* and the AMF 102*a*, and provides the key $K_{AMF}$ to the AMF. This process can take place, for example, during an authentication process with the user device 144**.

In some implementations, the AMF **102*a* generates subsequent sets of keys during communication with the user device 144. These include, for example, the $K_{NASint}$ and the $K_{NASinc}$ keys for protecting the non-access stratum layer (NAS). The keys generated by the AMF 102*a* also includes the $K_{gNB}$ and the $K_{NH}$ keys (e.g., based on next hop parameters), which are then provided to the gNB. In some implementations, one or more additional keys-including, for example, the radio resource control (RRC) integrity key ($K_{RRCint}$), the RRC encryption key ($K_{RRCenc}$), the user plane encryption key ($K_{UPenc}$), and the user plane integrity key ($K_{UPint}$) are generated from the $K_{gNB}$. These keys are used in protecting various RRC signalling and user plane traffic between the gNB and the user device 144**.

In some implementations, the AMF **102*a* generates and provides the $K_{N3IWF}$ key to the N3IWF 129. This key is used for communication between the user device 144 and the N3IWF 129 for untrusted non-3GPP access. In some implementations, one $K_{AMF}$ key can be derived from another $K_{AMF}$ key, for example, when the user device 144** moves from one AMF to another during mobility.

In some implementations, these keys are mathematical encryption keys that are transmitted from one module of the 5G O-RAN to another. However, it is possible to breach mathematical encryptions (colloquially referred to as a "hack"), and such cybersecurity breaches can potentially have devastating impacts. For example, when a healthcare infrastructure, smart city infrastructure, or a self-driving vehicle network is driven using an underlying 5G O-RAN, a breach in the 5G O-RAN can cause crippling outages and/or harmful breach of sensitive data, for example. If a cybersecurity breach is detected (or even determined to be likely), one solution is to shut down operations of the 5G O-RAN until the breach is addressed. However, such shutdowns may not be feasible or possible without causing significant accompanying collateral damages and inconveniences. The technology described herein espouses a solution where the encryption used between the different modules within the 5G O-RAN is switched from mathematical encryption to quantum encryption upon determination of a breach or potential breach. Quantum encryption is deemed to be virtually unbreachable—and as such, switching to quantum encryption upon detection of a breach or potential breach can allow for continued operation of the 5G O-RAN without compromising security of the network and associated systems.

Although quantum encryption is highly secure, implementing quantum encryption as a permanent encryption mechanism can be challenging, for example, due to high operating costs. As such, implementing 5G O-RANs with quantum encryption as the only encryption mechanism may not be feasible in various applications. To achieve a trade-off between operating costs and complexities, and the competing requirement to provide highly secure communications in the event of a breach (or suspected breach), the technology described herein espouses a mechanism wherein the encryption is switched between mathematical encryption and quantum encryption based on a risk assessment. Specifically, a trained machine learning (ML) model is provided to identify the presence of cybersecurity threats, and the encryption mechanism is switched between mathematical and quantum encryption accordingly. For example, if the existence of a cybersecurity breach is detected, the encryption employed in the communications between the various 5G O-RAN modules are switched from mathematical encryption to quantum encryption to provide a high degree of security and continued operation of the network as the detected threat is investigated. On the other hand, once the threat ceases to exist, the encryption mechanism can be switched to mathematical encryption.

Figure 3:
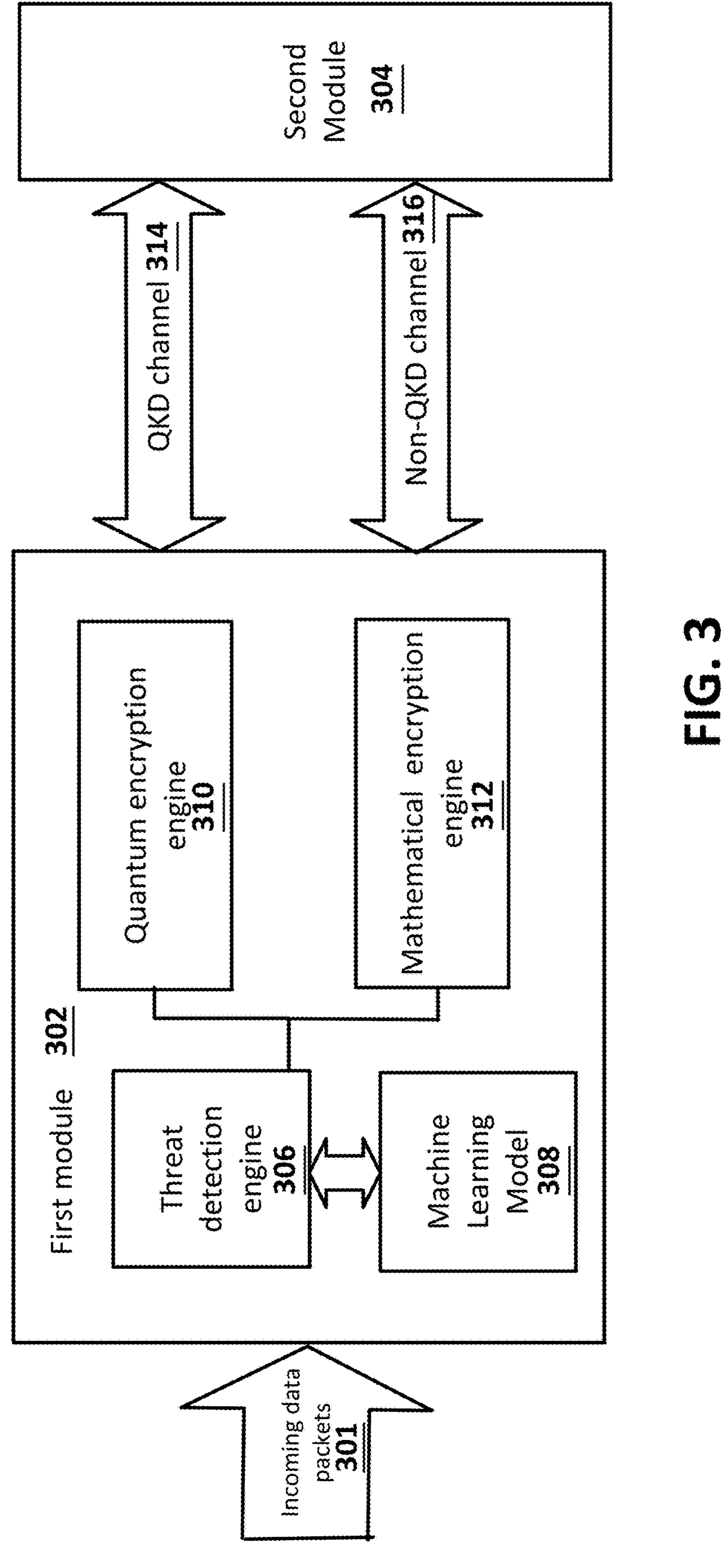
FIG. 3 is a block diagram of a system for implementing the technology described herein.

FIG. 3 is a block diagram of a system 300 for implementing the technology described herein. The system 300 includes, for example, a first module 302 of a 5G O-RAN communicating with a second module 304 of the 5G O-RAN. In some implementations, the first and second modules are each part of the 5G O-RAN core. For example, the first module 302 and the second module 304 can be one of: an AUSF module, a SEAF module, an AMF module or a non-3GPP interworking function (N3IWF) module of the 5G O-RAN core. In some implementations, at least one of the modules 302 and 304 can be located outside a 5G O-RAN core. For example, the at least one of the modules 302 and 304 can be a gNB or a user device. In some implementations, the modules 302 and 304 can be modules of non-5G networks, including for example, 4G LTE networks, 3G networks, or other wired or wireless communication networks.

In some implementations, the first module 302 includes a threat detection engine 306 that is configured to identify the existence of a cybersecurity threat (e.g., a security breach or a suspected/potential security breach) associated with a communication (e.g., pertaining to a voice or data transaction) taking place over the 5G O-RAN network. In some implementations, the threat detection engine 306 can be configured to analyze one or more incoming data packets 301 to identify the existence of a threat or potential threat, and generate an alert accordingly. The threat detection engine 306 can be configured to access a trained machine learning model 308 that is trained to identify the existence of cybersecurity threats based on the incoming data packets and/or one or more parameters of the voice or data transaction.

The machine learning model 308 can be of various types. In some implementations, the machine learning model 308 can be a supervised-learning based malware prediction model that is trained to recognize malware by learning parameters of harmful files/data. In some implementations, the machine learning model 308 can be trained to identify inconsistencies in the data packets to identify the existence of threats and potential threats. Other techniques such as deep learning, ensemble learning, explainable AI (XAI), or hybrid models employing multiple ML techniques can also be used to implement the machine learning model 308. In some implementations, the machine learning model 308 leverages an advanced unsupervised deep learning neural networks algorithm such as autoencoder that is used to predict anomalies in the network communications and/or to prevent breaches by previously unknown malwares and threats like zero-day attacks. In some implementations, data ingested through the 5G core network is stored in a distributed database that is used for training the machine learning model 308. In some implementations, training of the machine learning model 308 includes, for example, optimization of the threat detection engine 306 neural network by modifying/retraining the algorithm, tuning the hyperparameters, utilizing data augmentation and evaluating and monitoring the model.

In some implementations, based on an output of the threat detection engine 306, an encryption mechanism is selected by the first module 302. For example, if the incoming data packets 301 are encrypted using mathematical encryption, and the output of the threat detection engine 306 identifies the existence of a breach or suspected breach, communications to be sent out from the first module 302 are encrypted by a quantum encryption engine 310. On the other hand, if the incoming data packets 301 are encrypted using mathematical encryption, and the output of the threat detection engine 306 does not identify the existence of a breach or suspected breach, communications to be sent out from the first module 302 continue to be encrypted via mathematical encryption. This can include re-encryption of the incoming data packets 301 by a mathematical encryption engine 312, or simply passing on one or more of the incoming data packets 301 without decryption and re-encryption. In some implementations, when the incoming data packets 301 are quantum encrypted, and a determination is made that an earlier-detected cybersecurity threat is no longer present, the encryption can be switched from quantum encryption to mathematical encryption.

In some implementations, the quantum encryption engine 310 employs quantum key distribution (QKD) as the encryption mechanism. QKD implements the cryptography protocol based on quantum mechanics where optical communications are used to transmit encryption keys. Specifically, the polarization states associated with optically transmitted bits are varied randomly to transmit information. Due to the laws of physics, such optically transmitted communications cannot be breached without changing the polarization states associated with the bits-which in turn makes the breach easily detectable.

In some implementations, where the quantum encryption engine 310 employs QKD, the resultant communications are sent over a QKD, channel 314. In some implementations, the QKD channel includes an optical fiber connecting the first module 302 to the second module 304. For cloud-native 5G O-RANs, this may be implemented using optical fiber connections between the computing devices implementing the underlying cloud computing system.

In some implementations, when quantum encryption is employed, the quantum encryption engine 310 transmits a quantum encryption key over the QKD channel 314. The one or more data packets that are encrypted using that particular key can also be transmitted over the QKD, channel 314. In some implementations, while the quantum encryption key is transmitted over the QKD channel 314, the one or more data packets encrypted using that particular key are transmitted over a non-QKD, channel 316. The non-QKD channel 316 can include, for example, various types of wired or wireless channels, interconnecting computing devices of the underlying cloud computing system.

The mathematical encryption engine 312 can be used to implement various mathematical cryptography processes. In some implementations, the mathematical encryption engine 312 implements a symmetric cryptography algorithm-which uses the same key for encryption and decryption. In some implementations, the mathematical encryption engine 312 implements an asymmetric cryptography algorithm that uses different keys for encryption and decryption. Other types of mathematical encryption algorithms may also be used.

The second module 304 includes decryption engines to decrypt communications received from the first module 302. In some implementations, the second module 304 includes an encryption detection engine 318 configured to detect the type of encryption associated with incoming communications. For example, the encryption detection engine 318 can be configured to detect if the encryption associated with incoming communications is quantum encryption or mathematical encryption. Accordingly, the communications can be routed to either of a quantum decryption engine 320 or a mathematical decryption engine 322 for decryption. The quantum decryption engine 320 and the mathematical decryption engine 322 are configured to implement decryption processes that reverse the encryption introduced by the quantum encryption engine 310 or the mathematical encryption engine 312, respectively.

The encryption and decryption engines shown in the first and second modules 302 and 304 are illustrative of the functions of the corresponding modules in this particular example. In some implementations, the first module 302 can include decryption engines to decrypt incoming data packets 301. In some implementations, the second module 304 can include encryption engines (and possibly a corresponding threat detection engine 306) to perform functionalities described with respect to the first module 302.

Figure 4:
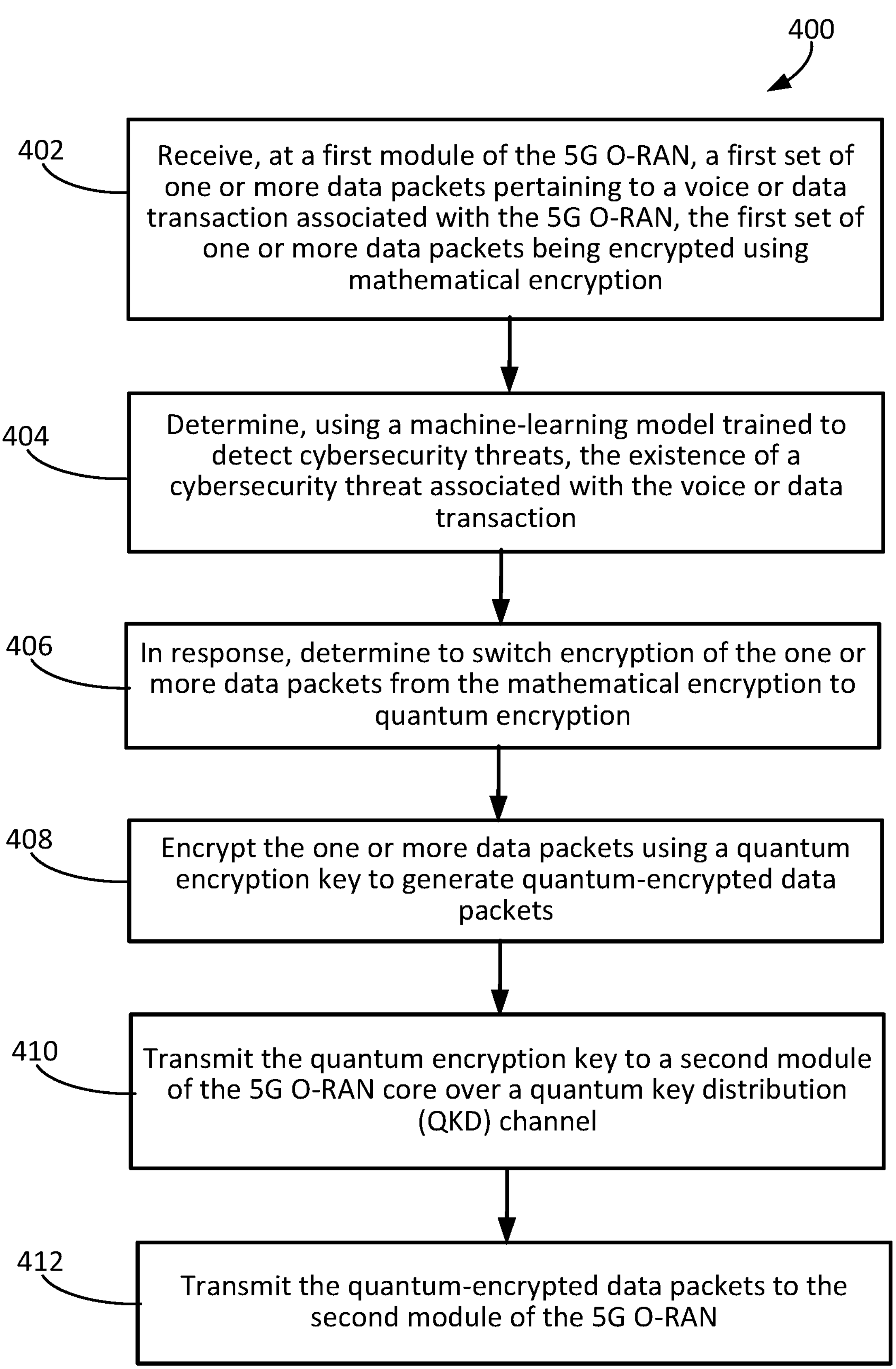
FIG. 4 is a flowchart of an example process for implementing the technology described herein.

FIG. 4 is a flowchart of a process 400 for encrypting data within a 5G O-RAN. While the flowchart is described with respect to an example of a 5G O-RAN, the process 400 can also be applied in other wired or wireless networks without deviating from the scope of the technology. Operations of the process 400 can be performed, for example, at various modules of a 5G O-RAN system. For example, at least a portion of the process 400 can be executed at one or more modules described above with reference to FIGS. 1 and 2.

Operations of the process 400 include receiving, at a first module of the 5G O-RAN, a first set of one or more data packets pertaining to a voice or data transaction associated with the 5G O-RAN (402). In some implementations, the first set of one or more data packets are encrypted using mathematical encryption such as symmetric key encryption or asymmetric key encryption. The first module can be a cloud-deployed module of the 5G O-RAN core such as the AUSF, SEAF, AMF, or N3IWF, for example. The second module can be a module of the 5G O-RAN core—such as the AUSF, SEAF, AMF, or N3IWF, for example—or a module/device outside of the 5G O-RAN core such as a gNB or a user device. In some implementations, the first and second modules can be substantially similar to the modules 302 and 304, respectively, as described with reference to FIG. 3.

Operations of process 400 also include determining, using a machine-learning model trained to detect cybersecurity threats, the existence of a cybersecurity threat associated with the voice or data transaction (404). The machine learning model can include a deep learning model configured to detect cyber security threats, or other types of models, for example, as described above with reference to FIG. 3.

Operations of process 400 further include determining, in response to determining the existence of the cybersecurity threat associated with the voice or data transaction, to switch encryption of the one or more data packets from the mathematical encryption to quantum encryption. In some implementations, this can be done, for example, using a combination of modules/devices as described above with reference to FIG. 3. For example, switching the encryption can include decrypting incoming packets and re-encrypting the packets in accordance with the selected encryption process. In some implementations, the selected encryption process is QKD, and the process 400 further includes encrypting the one or more data packets using a quantum encryption key to generate quantum-encrypted data packets (408). The corresponding quantum encryption key can be transmitted from the first module of the 5G O-RAN core to a second module of the 5G O-RAN over a QKD channel (410). The QKD channel can be a fiber optic channel, or another channel that supports optical communications between the first module and the second module. In some implementations, the QKD channel can be substantially similar to the QKD channel described above with reference to FIG. 3.

Operations of the process also includes transmitting the quantum-encrypted data packets from the first module of the 5G O-RAN to the second module of the 5G O-RAN (412). The quantum-encrypted data packets can be transmitted over the QKD, channel, or in some implementations, over a non-QKD channel, such as the channel 316 described above with reference to FIG. 3. In some implementations, once a determination is made that the cybersecurity threat that prompted the switch from mathematical encryption to quantum encryption has been addressed, a determination is made to switch the encryption mechanism from quantum encryption to mathematical encryption. In some implementations, this intelligent switching between quantum and mathematical encryption allows for optimal functioning of the underlying network by balancing security needs with operational costs.

Figure 5:
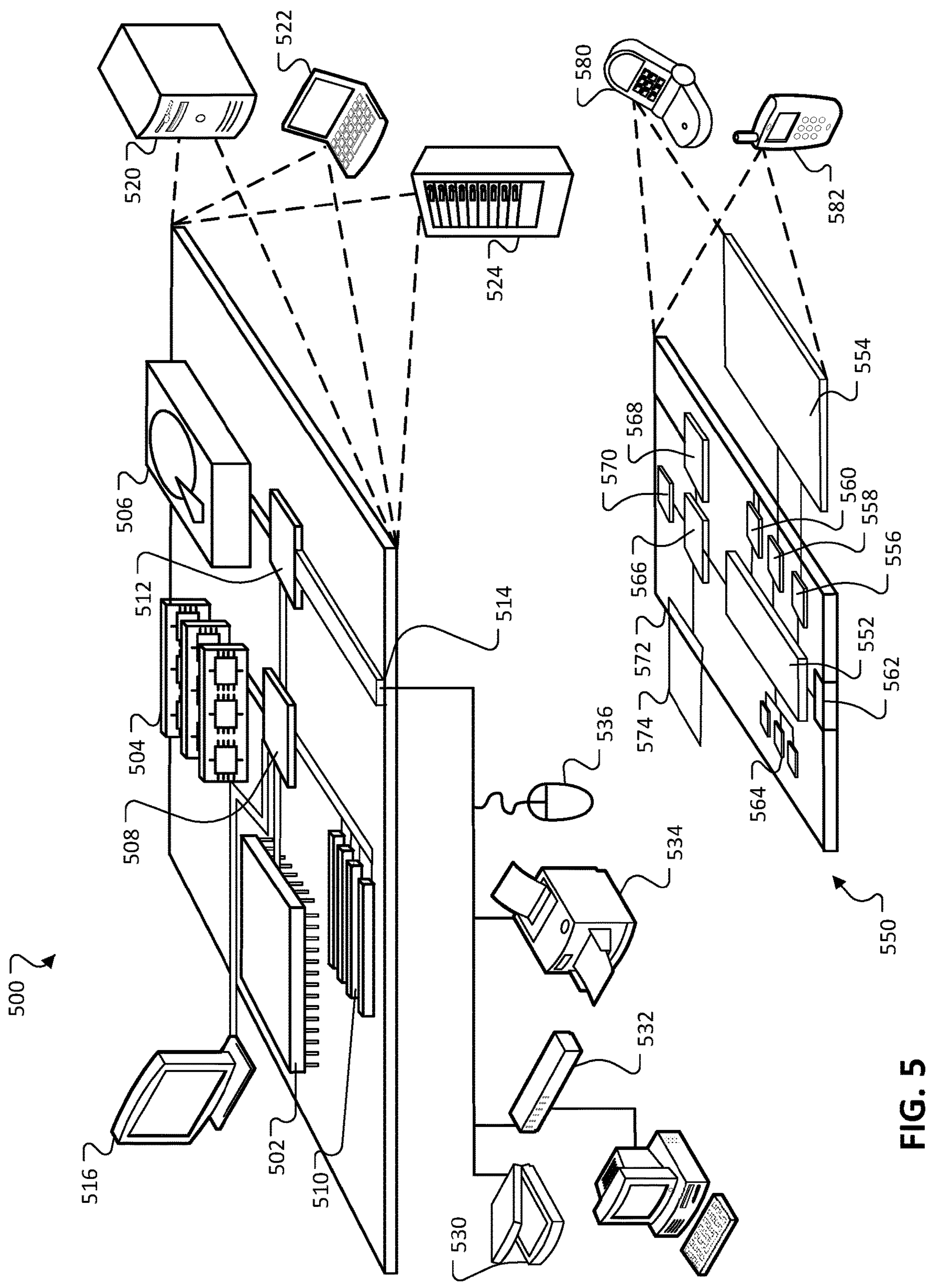
FIG. 5 is a diagram illustrating an example of computing systems and devices that can be used to implement the technology described herein.

FIG. 5 shows an example of a computing device 500 and a mobile computing device 550 that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 500 and/or the mobile computing device 550 can form at least a portion of the network environments (e.g., environment 100) described above. The computing device 500 and/or the mobile computing device 550 can also form at least a portion of the user-devices (e.g., user-device 144) described above. In some implementations, the network functions and/or network entities described above can be implemented using a cloud infrastructure including multiple computing devices 500 and/or mobile computing devices 550.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 504. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user-interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 514 through a network adapter. Such network input/output devices may include, for example, a switch or router. In some implementations, multiple computing devices and/or mobile devices can be connected via a network (e.g., a fiber optic network) that is configured to support QKD channels described above.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user-interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS), IP Multimedia Subsystem (IMS) technologies, and 5G technologies. Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. For example, it may be implemented in the user-device described with respect to FIG. 1. Other implementations may include a phone device 580, a personal digital assistant 582, and a tablet device (not shown). The mobile computing device 550 may also be implemented as a component of a smart-phone, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments.

What is claimed is:

1. A method of encrypting data within a 5G Open Radio Access Network (O-RAN), the method comprising:

receiving, at a first module of the 5G O-RAN, a first set of one or more data packets pertaining to a voice or data transaction associated with the 5G O-RAN, the first set of one or more data packets being encrypted using mathematical encryption;

determining, based on the first set of one or more data packets and using a machine-learning model trained to detect cybersecurity threats, an existence of a cybersecurity threat associated with the voice or data transaction;

in response to determining the existence of the cybersecurity threat associated with the voice or data transaction based on the first set of one or more data packets, determining to switch encryption of the one or more data packets from the mathematical encryption to quantum encryption;

encrypting the one or more data packets using a quantum encryption key to generate quantum-encrypted data packets;

transmitting the quantum encryption key from the first module of the 5G O-RAN to a second module of the 5G O-RAN over a quantum key distribution (QKD) channel; and transmitting the quantum-encrypted data packets from the first module of the 5G O-RAN to the second module of the 5G O-RAN.

2. The method of claim 1, comprising:

determining that the cybersecurity threat has been addressed; and responsive to determining that the cybersecurity threat has been addressed, determining to switch from the quantum encryption to the mathematical encryption.

3. The method of claim 1, wherein the first module is a cloud-deployed module of the 5G O-RAN core.

4. The method of claim 1, wherein the first module is one of: an authentication server function (AUSF) module, a secure anchor function (SEAF) module, an access and mobility management function (AMF) module or a non-3GPP interworking function (N3IWF) module of a core of the 5G O-RAN.

5. The method of claim 1, wherein the second module is one of: a secure anchor function (SEAF) module, an access and mobility management function (AMF) module, a non-3GPP interworking function (N3IWF) module of a core of the 5G O-RAN, or a g-NodeB (gNB) of the 5G O-RAN.

6. The method of claim 1, wherein the machine-learning model is a deep learning model configured to detect cyber security threats based on data representing an input set of one or more data packets.

7. The method of claim 1, wherein the QKD channel is a fiber-optic channel.

8. The method of claim 1, wherein the quantum-encrypted data packets are transmitted from the first module of the 5G O-RAN to the second module of the 5G O-RAN over the QKD channel.

9. The method of claim 1, comprising:

decrypting the first set of one or more data packets using mathematical decryption, wherein encrypting the one or more data packets using the quantum encryption key to generate the quantum-encrypted data packets comprises:

encrypting a decrypted version of the one or more data packets after decrypting the first set of one or more data packets using mathematical decryption.

10. A system of encrypting data within a 5G Open Radio Access Network (O-RAN), the system comprising:

memory encoded with machine-readable instructions; and one or more processors coupled to the memory, and configured to execute the machine-readable instructions, which when executed, cause the one or more processors to execute operations comprising:

receiving, at a first module of the 5G O-RAN, a first set of one or more data packets pertaining to a voice or data transaction associated with the 5G O-RAN, the first set of one or more data packets being encrypted using mathematical encryption, determining, based on the first set of one or more data packets and using a machine-learning model trained to detect cybersecurity threats, an existence of a cybersecurity threat associated with the voice or data transaction, in response to determining the existence of the cybersecurity threat associated with the voice or data transaction based on the first set of one or more data packets, determining to switch encryption of the one or more data packets from the mathematical encryption to quantum encryption, encrypting the one or more data packets using a quantum encryption key to generate quantum-encrypted data packets, transmitting the quantum encryption key from the first module of the 5G O-RAN to a second module of the 5G O-RAN over a quantum key distribution (QKD) channel, and transmitting the quantum-encrypted data packets from the first module of the 5G O-RAN to the second module of the 5G O-RAN.

11. The system of claim 10, wherein the operations comprise:

determining that the cybersecurity threat has been addressed; and responsive to determining that the cybersecurity threat has been addressed, determining to switch from the quantum encryption to the mathematical encryption.

12. The system of claim 10, wherein the first module is a cloud-deployed module of a core of the 5G O-RAN.

13. The system of claim 10, wherein the first module is one of: an authentication server function (AUSF) module, a secure anchor function (SEAF) module, an access and mobility management function (AMF) module or a non-3GPP interworking function (N3IWF) module of a core of the 5G O-RAN.

14. The system of claim 10, wherein the second module is one of: a secure anchor function (SEAF) module, an access and mobility management function (AMF) module, a non-3GPP interworking function (N3IWF) module of the 5G O-RAN core, or a g-NodeB (gNB) of the 5G O-RAN.

15. The system of claim 10, wherein the machine-learning model is a deep learning model configured to detect cyber security threats based on data representing an input set of one or more data packets.

16. The system of claim 10, wherein the quantum-encrypted data packets are transmitted from the first module of the 5G O-RAN to the second module of the 5G O-RAN over the QKD channel.

17. At least one non-transitory machine-readable storage device encoded with machine-readable instructions, which when executed, cause one or more processing devices to execute operations comprising:

receiving, at a first module of a 5G Open Radio Access Network (O-RAN), a first set of one or more data packets pertaining to a voice or data transaction associated with the 5G O-RAN, the first set of one or more data packets being encrypted using mathematical encryption, determining, based on the first set of one or more data packets and using a machine-learning model trained to detect cybersecurity threats, an existence of a cybersecurity threat associated with the voice or data transaction, in response to determining the existence of the cybersecurity threat associated with the voice or data transaction based on the first set of one or more data packets, determining to switch encryption of the one or more data packets from the mathematical encryption to quantum encryption, encrypting the one or more data packets using a quantum encryption key to generate quantum-encrypted data packets, transmitting the quantum encryption key from the first module of the 5G O-RAN to a second module of the 5G O-RAN over a quantum key distribution (QKD) channel, and transmitting the quantum-encrypted data packets from the first module of the 5G O-RAN to the second module of the 5G O-RAN.

18. The non-transitory machine-readable storage device of claim 17, wherein the operations comprise:

determining that the cybersecurity threat has been addressed; and responsive to determining that the cybersecurity threat has been addressed, determining to switch from the quantum encryption to the mathematical encryption.

19. The non-transitory machine-readable storage device of claim 17, wherein the first module is one of: an authentication server function (AUSF) module, a secure anchor function (SEAF) module, an access and mobility management function (AMF) module or a non-3GPP interworking function (N3IWF) module of a core of the 5G O-RAN, and the second module is one of: a secure anchor function (SEAF) module, an access and mobility management function (AMF) module, a non-3GPP interworking function (N3IWF) module of a core of the 5G O-RAN, or a g-NodeB (gNB) of the 5G O-RAN.

20. The non-transitory machine-readable storage device of claim 17, wherein the quantum-encrypted data packets are transmitted from the first module of the 5G O-RAN to the second module of the 5G O-RAN over the QKD channel.

* * * * *